United States Patent
Van Druten et al.

(10) Patent No.: US 9,897,182 B2
(45) Date of Patent: Feb. 20, 2018

(54) TRANSMISSION SYSTEM (71) Applicant: DTI Group B.V., Eindhoven (NL)

(72) Inventors: Roëll Marie Van Druten, Eindhoven (NL); Alexander Franciscus Anita Serrarens, Waalre (NL); Bas Gerard Vroemen, Eindhoven (NL)

(73) Assignee: DTI Group B.V., Eindhoven (NL)

( * ) Notice: Subject to any disclaimer, the term of this patent is extended or adjusted under 35 U.S.C. 154(b) by 0 days.

(21) Appl. No.: 14/417,093

(22) PCT Filed: Jul. 24, 2013

(86) PCT No.: PCT/NL2013/050552
§ 371 (c)(1),
(2) Date: Jan. 23, 2015

(87) PCT Pub. No.: WO2014/017905
PCT Pub. Date: Jan. 30, 2014

(65) Prior Publication Data
US 2015/0211613 A1  Jul. 30, 2015

(30) Foreign Application Priority Data

Jul. 24, 2012 (NL) ...................................... 2009226

(51) Int. Cl.
*F16H 1/28* (2006.01)
*F16H 37/02* (2006.01)
(Continued)

(52) U.S. Cl.
CPC ............ *F16H 37/022* (2013.01); *F16H 3/006* (2013.01); *F16H 3/721* (2013.01); *F16H 3/724* (2013.01);
(Continued)

(58) Field of Classification Search
CPC ........... F16H 1/163; F16H 1/166; F16H 1/225
(Continued)

(56) References Cited

U.S. PATENT DOCUMENTS 5,407,401 A * 4/1995 Bullmer ................ B60W 10/04
477/109
7,080,569 B2 * 7/2006 Preisner ................ F16H 61/688
74/337
(Continued)

FOREIGN PATENT DOCUMENTS

CN 101144520 A 3/2008
CN 101779060 A 7/2010
(Continued)

*Primary Examiner* — Ha D Ho
(74) *Attorney, Agent, or Firm* — Banner & Witcoff, Ltd.

(57) ABSTRACT

An exemplary transmission system (TS) includes a clutch module (CM) having an input (In) and a first and a second output (O1, O2). A first clutch device (B, B1, C2) provided with a first actuator is present between the first output and the input, and a second clutch device (C, B2) with a second actuator is present between the second output and the input. The transmission system also includes a transmission module (TM), with an output (Out) and a first and a second input (i1, i2). A first partial transmission provided with at least one transmission (VAR) is present between the first input and the output, and a second partial transmission provided with at least one further transmission or a mechanical connection is present between the second input and the output. Two outputs (O1, O2) of the clutch module are connected to the two inputs (i1, i2) of the transmission module.

20 Claims, 15 Drawing Sheets

(51) Int. Cl.
*F16H 3/00* (2006.01)
*F16H 3/72* (2006.01)

(52) U.S. Cl.
CPC .... *Y10T 74/19023* (2015.01); *Y10T 74/19037* (2015.01)

(58) Field of Classification Search
USPC .................................................. 74/330, 665 F
See application file for complete search history.

(56) References Cited

U.S. PATENT DOCUMENTS

| | | | | |
|---|---|---|---|---|
| 7,840,329 | B2* | 11/2010 | Katakura | F16H 61/0437 477/109 |
| 8,050,830 | B2* | 11/2011 | Komeda | B60K 6/387 701/51 |
| 8,177,685 | B2* | 5/2012 | Leibbrandt | F16D 48/08 477/109 |
| 8,360,183 | B2* | 1/2013 | Sauvlet | B60K 6/48 180/65.265 |
| 2003/0074992 | A1* | 4/2003 | Gierling | B60W 10/02 74/335 |
| 2003/0148847 | A1 | 8/2003 | Kawamoto et al. | |
| 2008/0064550 | A1 | 3/2008 | Holmes | |
| 2008/0236917 | A1 | 10/2008 | Abe et al. | |

FOREIGN PATENT DOCUMENTS

| | | |
|---|---|---|
| EP | 1209017 | 5/2002 |
| JP | 2002089677 A | 3/2002 |
| JP | 2008247192 A | 10/2008 |
| WO | 02070919 A1 | 9/2002 |
| WO | 2008151443 A1 | 12/2008 |
| WO | WO2011133033 | 10/2011 |
| WO | WO2012102613 | 8/2012 |
| WO | WO 2012102614 | 8/2012 |
| WO | WO 2012112028 | 8/2012 |

* cited by examiner

TRANSMISSION SYSTEM

TECHNICAL FILED OF THE INVENTION

The invention relates to a transmission system comprising:
a clutch module having an input and a first and a second output, wherein between the first output and the input, a first clutch device provided with first actuating means is present, and between the second output and the input a second clutch device with second actuating means is present, and
a transmission module, with an output and a first and a second input, wherein between the first input and the output, a first partial transmission provided with at least one transmission is present, and between the second input and the output a second partial transmission provided with at least one further transmission or a mechanical connection is present,
in which the two outputs of the clutch module are connected to the two inputs of the transmission module.

BACKGROUND OF THE INVENTION

Such a transmission system is generally known.

SUMMARY OF THE INVENTION

It is an object of the present invention to improve the known transmission system. To this end the transmission system according to the invention is characterized in that:
the transmission system comprises a short-circuit clutch, which is present between the two outputs of the clutch module and/or the two inputs of the transmission module, and
the transmission inside the first partial transmission is continuously variable within a specified transmission range.

For embodiments of the transmission system according to the invention, reference is made to the appended claims.

The invention further relates to a transmission system for a vehicle, comprising an input, which can be connected to a drive source, and an output, which can be connected to a load, comprising:
a transmission provided with a transmission housing with a first input shaft and an output shaft connected to the output, wherein a first switchable speed transforming gear is present between the first input shaft and the output shaft,
a clutch with a first clutch part, which is connected to the input, and a second clutch part, which is connected to the first input shaft of the transmission, and
a planetary gear with at least three rotational members of which a first rotation body is connected to the input, and a second rotation body is coupled to the output,
wherein the transmission further comprises a second input shaft, wherein between the second input shaft and the output shaft a second switchable speed transforming gear is present, and wherein the second rotational member of the planetary gear is connected with the second input shaft.

With respect to this transmission system, the invention is characterized in that a third rotational member of the planetary gear is connected to an electric motor.

An embodiment of this transmission system is characterized in that the third rotation body is further connected to a brake.

The invention will be further elucidated below on the basis of drawings. These drawings show embodiments of the transmission system according to the method in the present invention.

DETAILED DESCRIPTION OF THE INVENTION

In FIGS. 1 to 4 embodiments of the transmission system according to the invention are shown. In these embodiments the variable speed drive may be mechanical, hydraulic, electrical, or as a combination of these.

Examples of mechanical variable speed drives are:
a pulley variable speed drive with push belt or chain,
a cone-ring variable speed drive with two cones and a ring,
a planetary gear with at least three rotational members of which a third rotational member can support torque to the fixed world via actuating means.

In these embodiments:
A=drive source
L=load
TS=transmission system
In=input of transmission system
Out=output of transmission system
CM=clutch module
O1, O2=outputs of clutch module
TM=transmission module
i1, i2=inputs of transmission module
C, C1=clutches
B,B1,B2=brakes
P=planetary gear set
VAR=variable speed drive
T1, T2=first and second partial transmissions
I, I1, I2, I11, I22=speed transforming gears
S=short circuit clutch
S1, S2, SR, S11, S22=transmission clutches
IF=final speed transforming gear
IR=reverse speed transforming gear
EM=electric motor In FIG. 2 the transmission clutches S1 and S2 are optionally.

Figure 1:
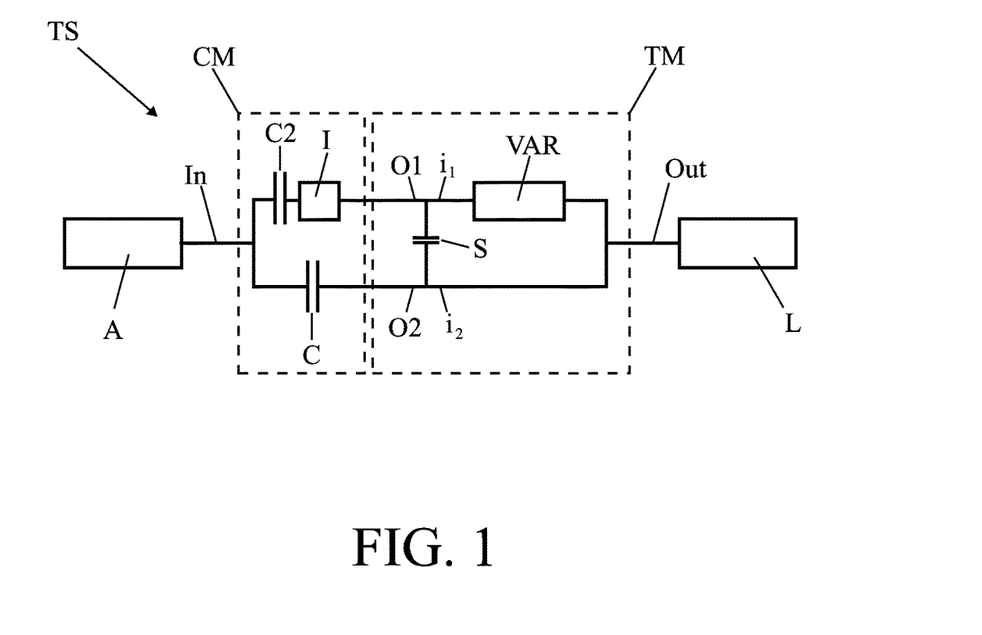
FIGS. 1-12 show embodiments of a transmission system according to the present invention.
Figure 2:
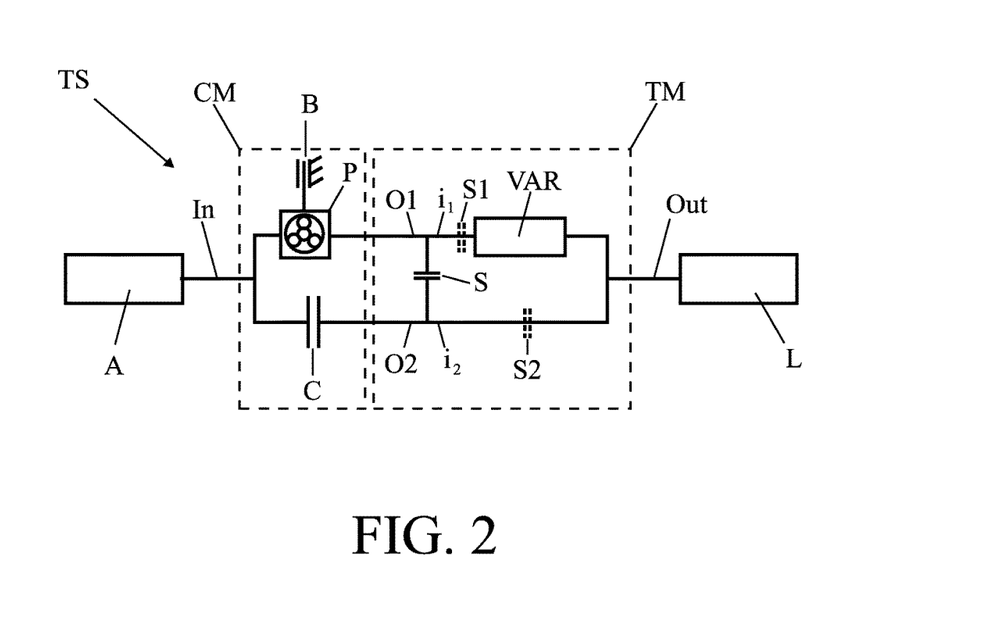
Figure 3:
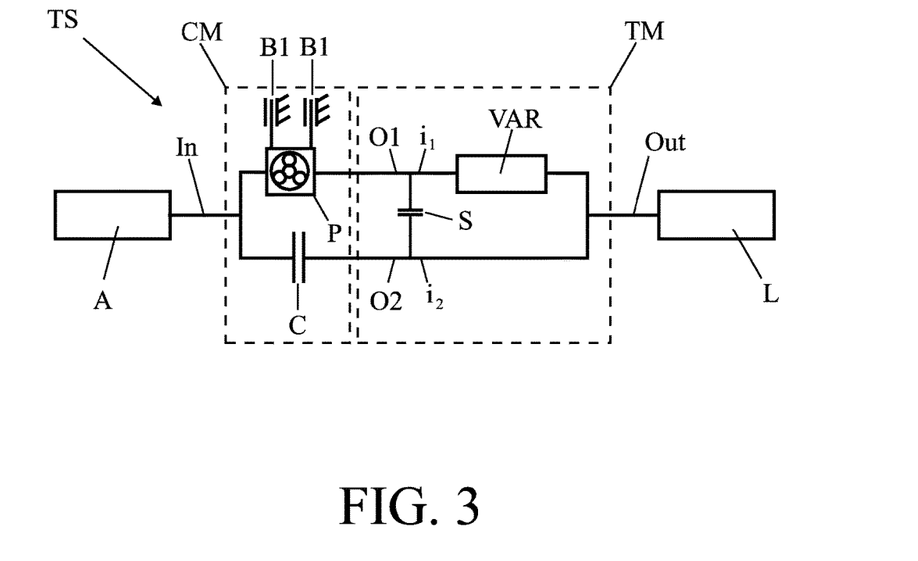
Figure 4:
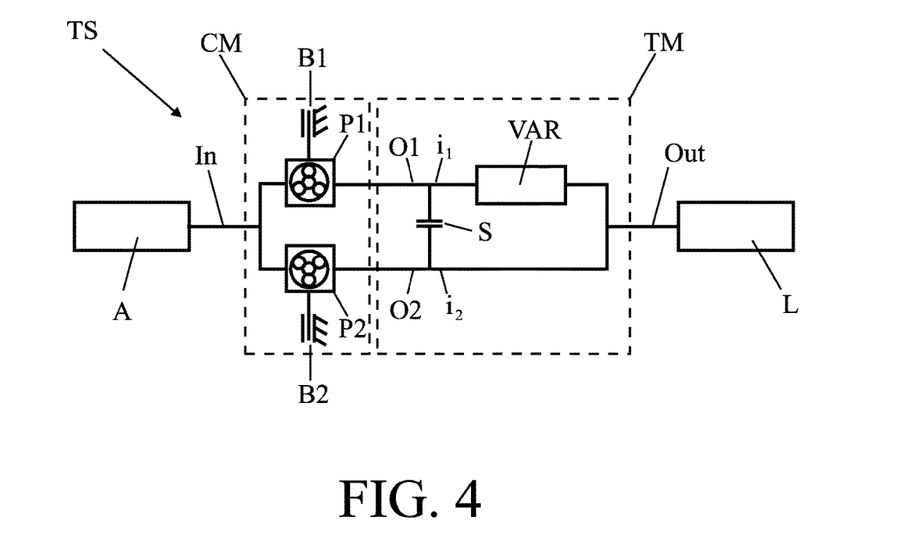
Figure 5:
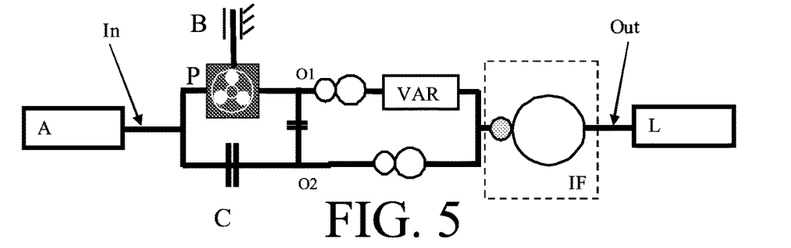
Figure 6:
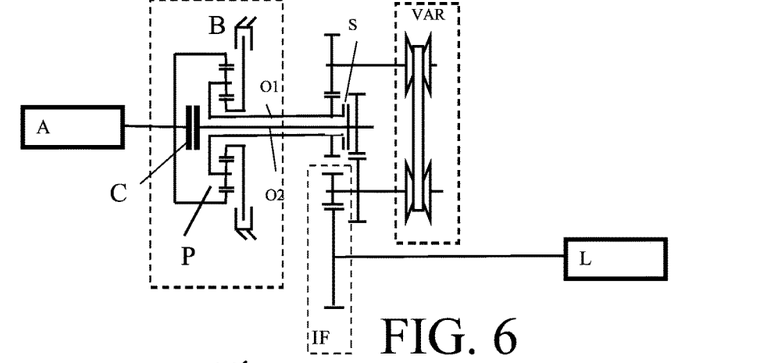

FIGS. 5 and 6 show an embodiment of the transmission system.

Figure 7:
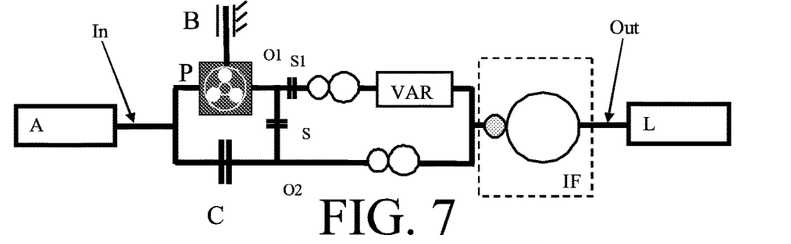
Figure 8:
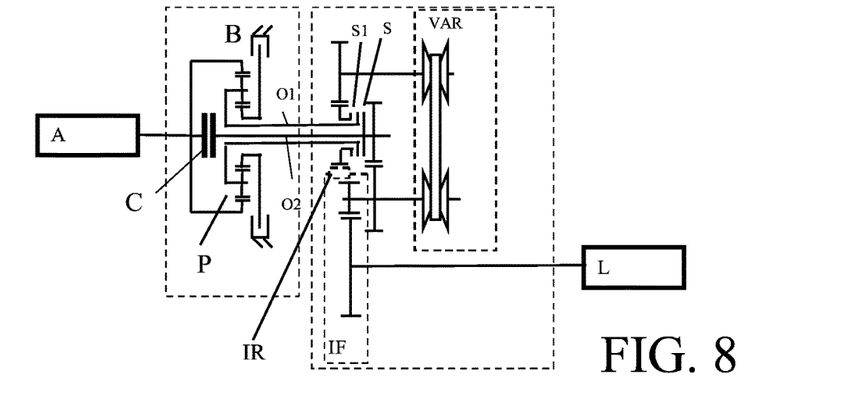

FIGS. 7 and 8 show a further embodiment of the transmission system. In the partial transmission which is present between the second input O2 and output Out or in the final transmission IF a reverse gear IR is present. By actuating brake B it is possible to drive from stand still in both forward and rearward directions. The variable speed drive VAR will not be used in that case. When switching from the brake to the clutch drive torque remains present. When the clutch is closed and the brake is open the variable speed drive is still not used.

Now the claw coupling and/or synchronizer S can be decoupled and S1 can be closed. By switching back again from the brake to the clutch drive can be performed via the variable speed drive and the higher gears can be realized. Thus there are two toothed gears with which driving from stand still is possible and the $3^{rd}$ gear and higher gears (3-10) can be realized with the variable speed drive. Because of this an extremely large ratio coverage can be achieved. In addition, the variable speed drive can be much smaller (RC between 3 and 4).

Figure 9:
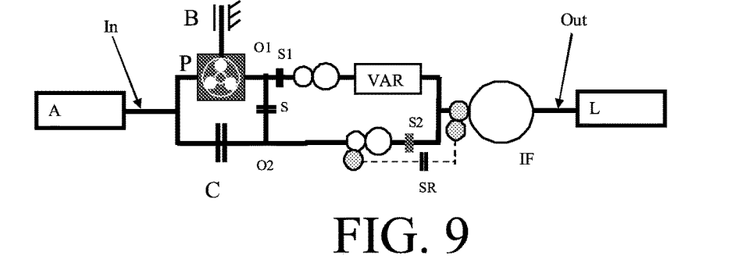
Figure 10:
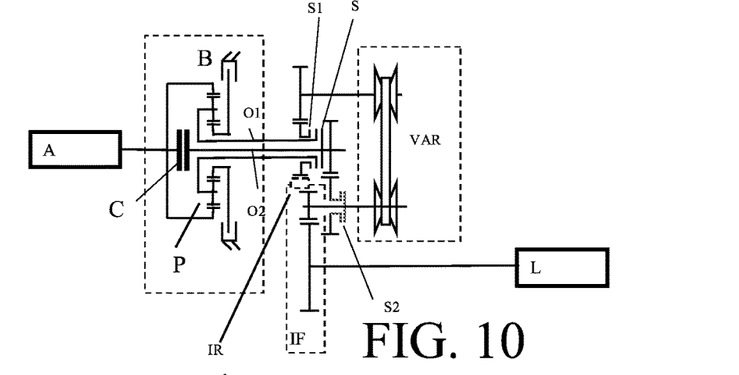

FIGS. 9 and 10 show a further embodiment of the transmission system. In the partial transmission which is present between the second input O2 and output Out or in the final transmission IF a reverse gear IR is present. By actuating brake B it is possible to drive from stand still in both forward and rearward directions. The variable speed drive VAR will not be used in that case. When switching from the brake to the clutch drive torque remains present. When the clutch is closed and the brake is open the variable speed drive is still not used.

Now the claw coupling and/or synchronizer S can be decoupled and S1 can be closed. By switching back again from the brake to the clutch drive can be performed via the variable speed drive and the higher gears can be realized. Now switching from clutch to brake can be performed so that the ratio coverage can still be increased. Thus there are two toothed gears with which driving from stand still is possible and the $3^{rd}$ and $4^{th}$ gears can be realized with the variable speed drive. Because of this an extremely large ratio coverage can be achieved. In addition, the variable speed drive can be much smaller (RC between 2,5 and 3,5).

Figure 11:
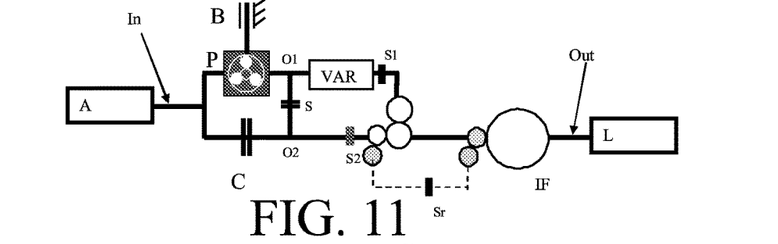
Figure 12:
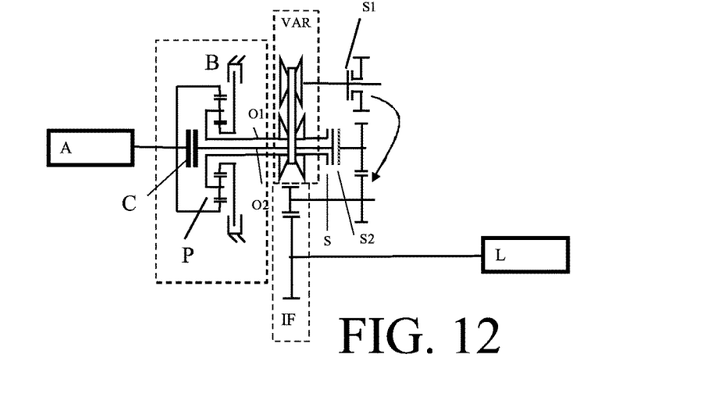

FIGS. 11 and 12 show still a further embodiment of the transmission system. In the partial transmission which is present between the second input O2 and output Out or in the final transmission IF a reverse gear IR is present. Gear wheels of the partial transmission or the final transmission IF are part of the reverse gear.

Figure 13:
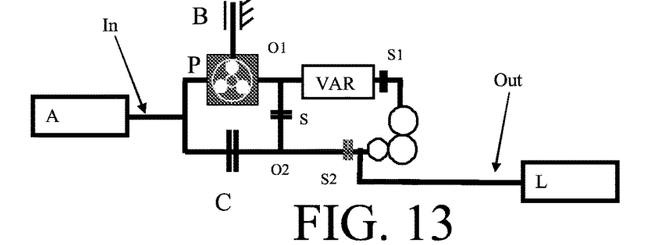
FIGS. 13 and 14 show further embodiments of a transmission system according to the present invention, for rear wheel drive.
Figure 14:
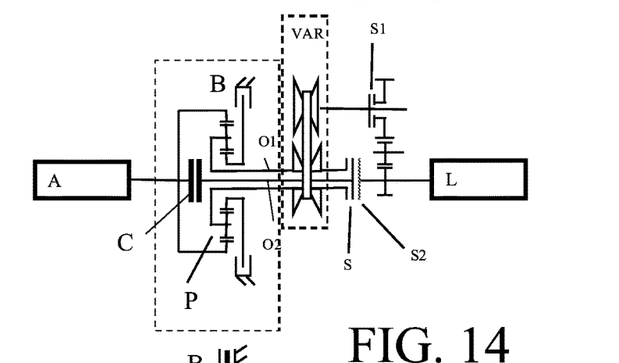
Figure 15:
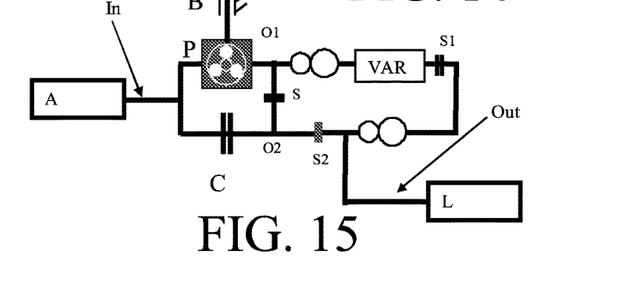
FIGS. 15-31 and 33 show yet further embodiments of a transmission system according to the present invention.
Figure 16:
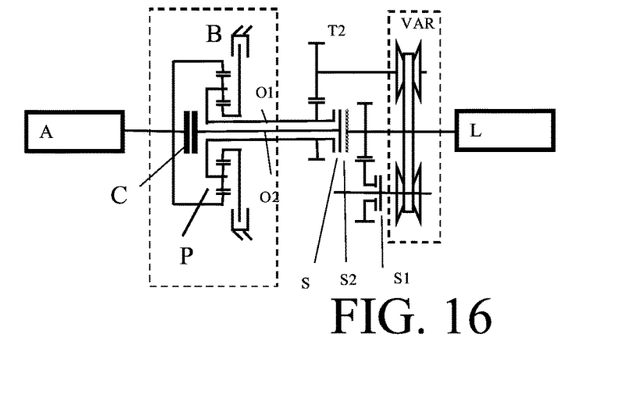
Figure 17:
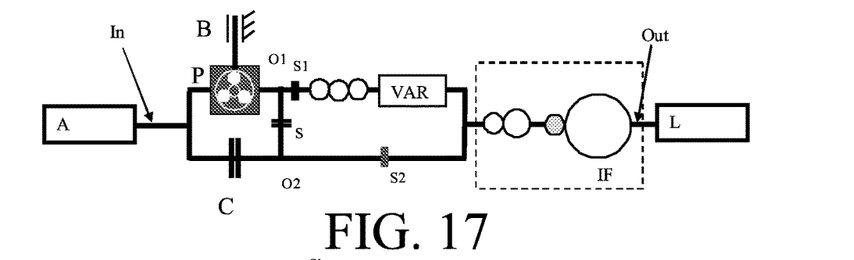
Figure 18:
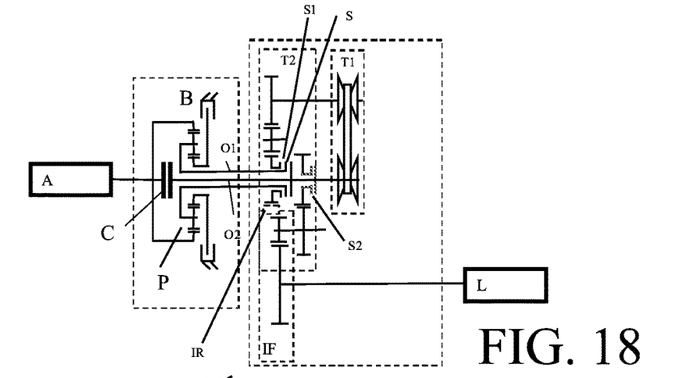
Figure 19:
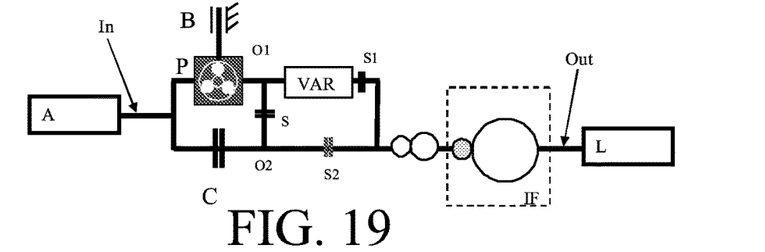

FIGS. 13 and 14 show an embodiment of the transmission system for rear wheel drive.

Figure 20:
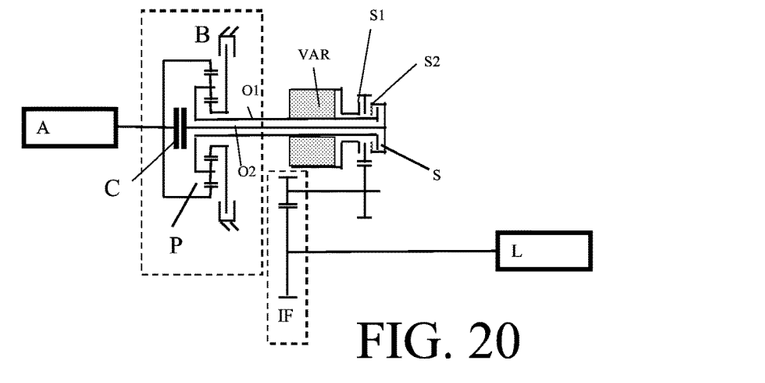
Figure 21:
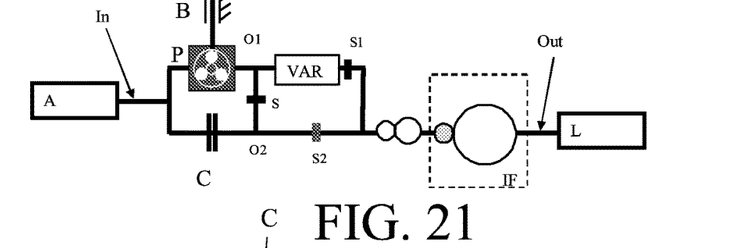
Figure 22:
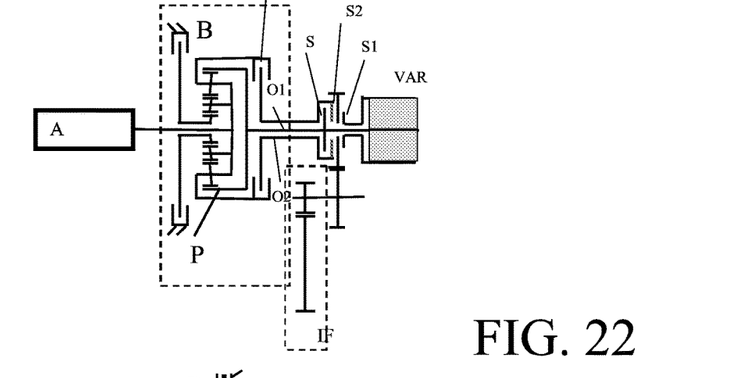
Figure 23:
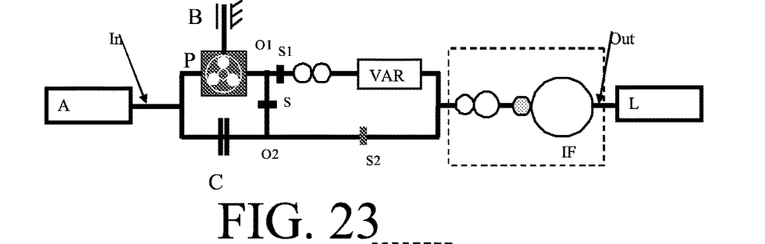
Figure 24:
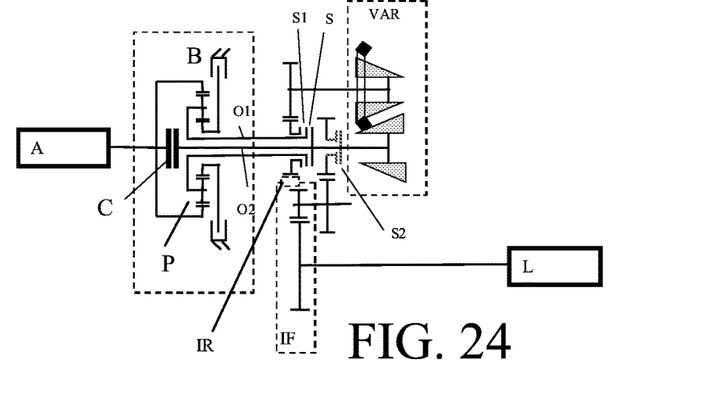
Figure 25:
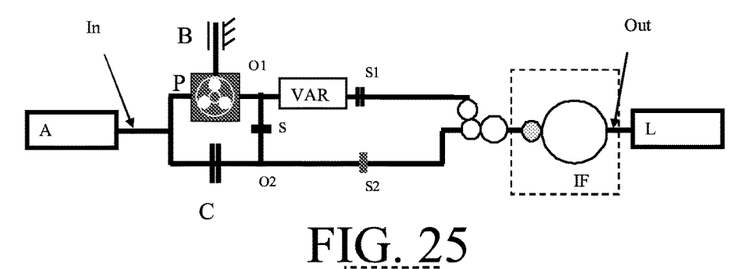
Figure 26:
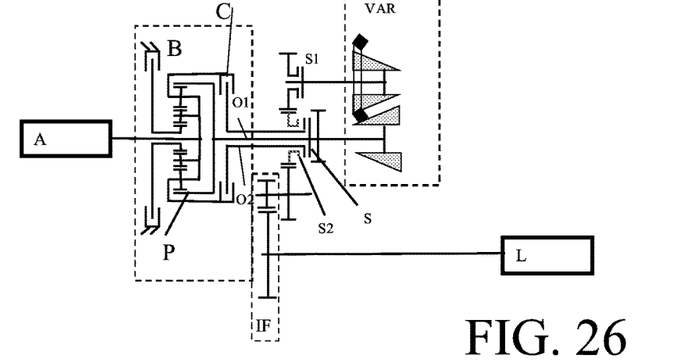
Figure 27:
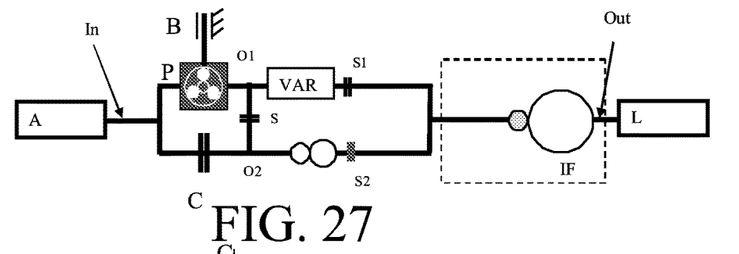
Figure 28:
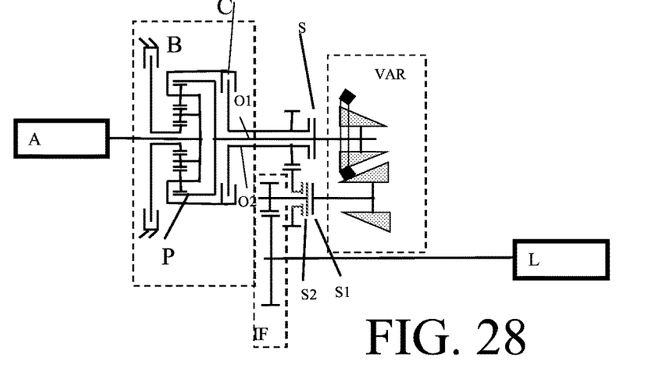
Figure 29:
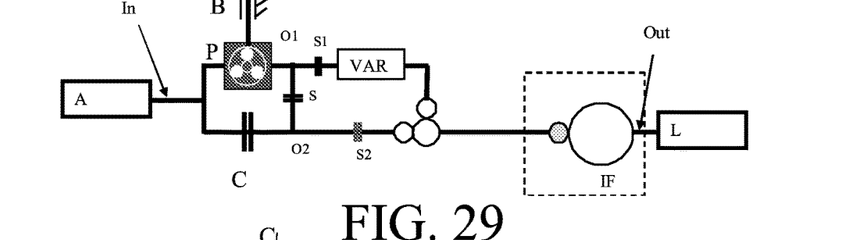
Figure 30:
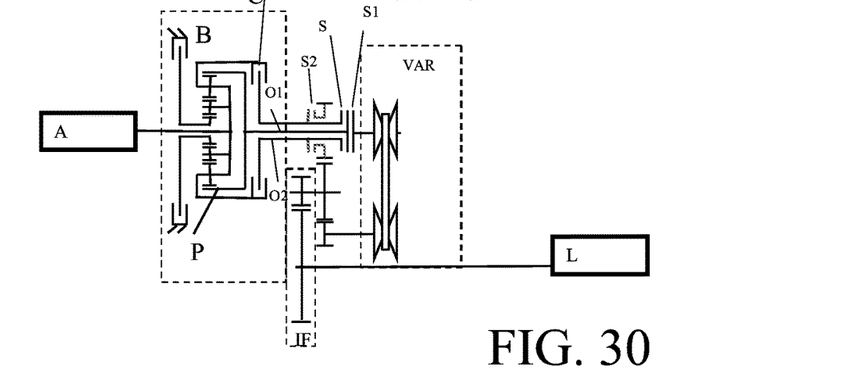
Figure 31:
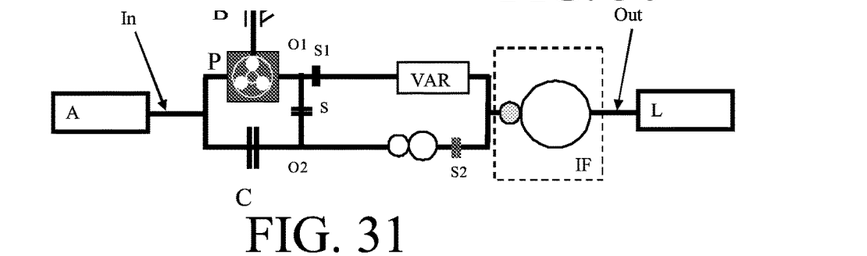

FIGS. 15 to 30 show further embodiments of the transmission system. The variable speed drives of the transmission systems shown in FIGS. 20 and 22 have an input and an output which are concentric/coaxial and the input and output have the same direction of rotation.

Figure 32:
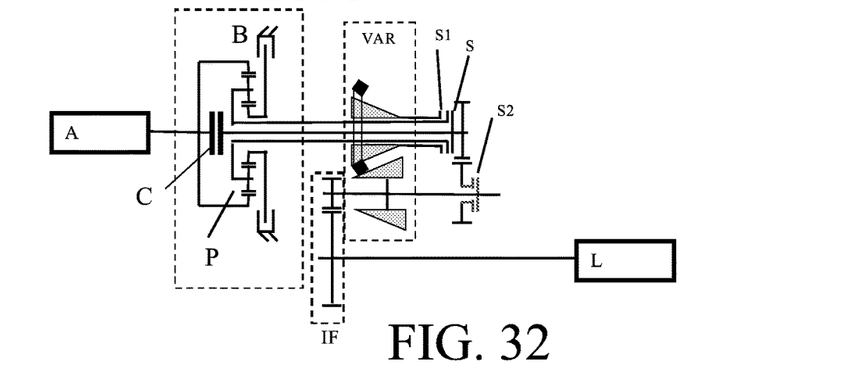
FIGS. 32 and 34 show still further embodiments of a transmission system according to the present invention, having a variable speed drive, for example a cone-ring variable speed drive.
Figure 33:
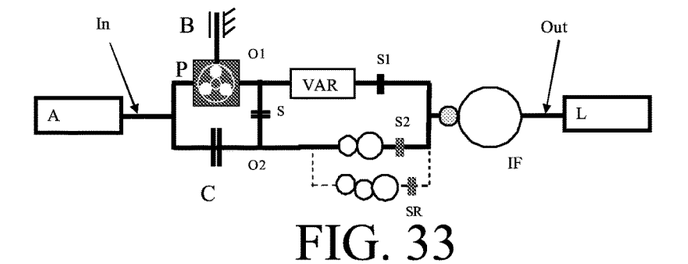
Figure 34:
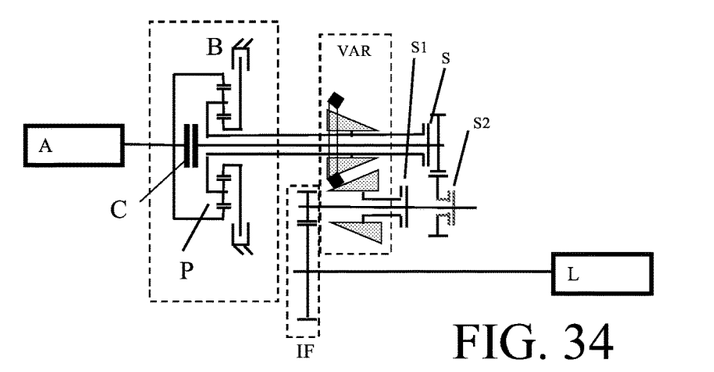
Figure 35:
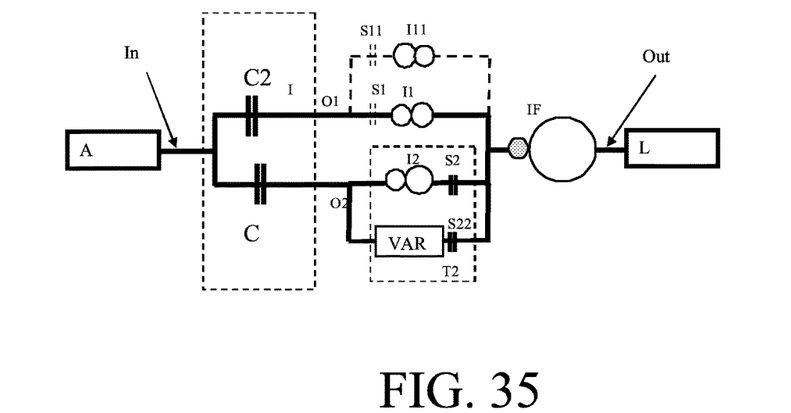
FIGS. 35-45 show still further embodiments of a transmission system according to the present invention, comprising a clutch.
Figure 36:
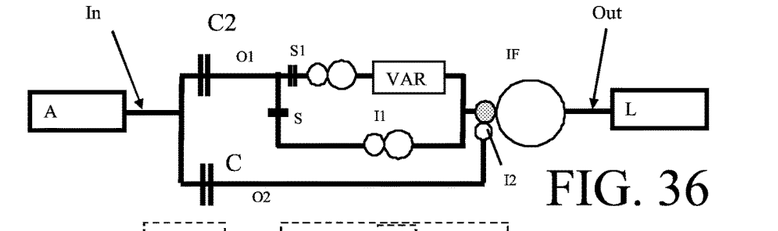
Figures 37, 38:
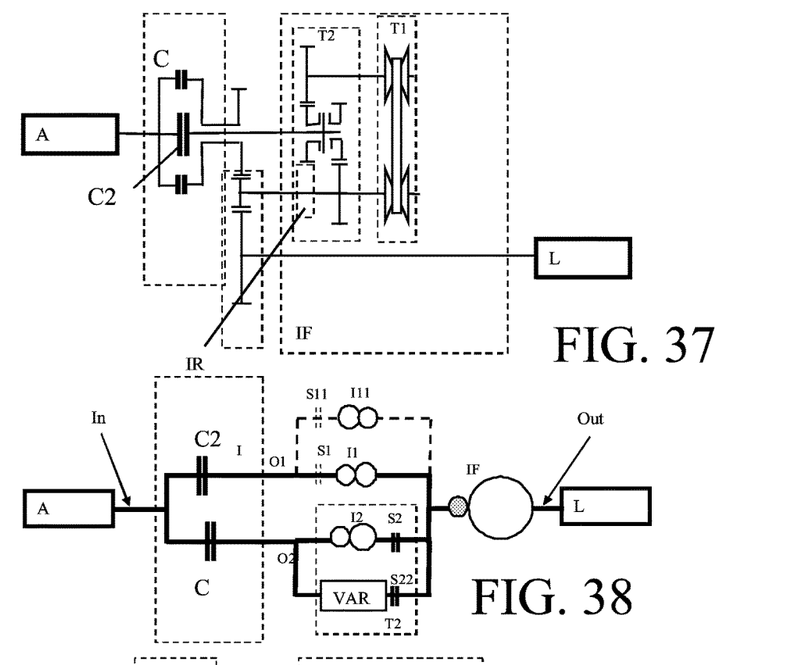
Figure 39:
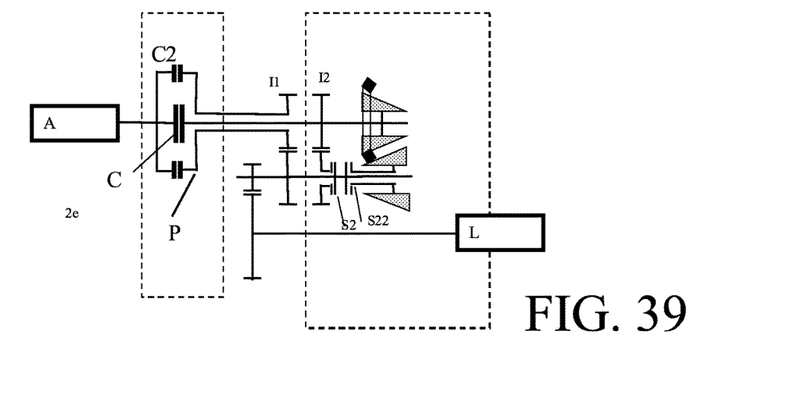
Figure 40:
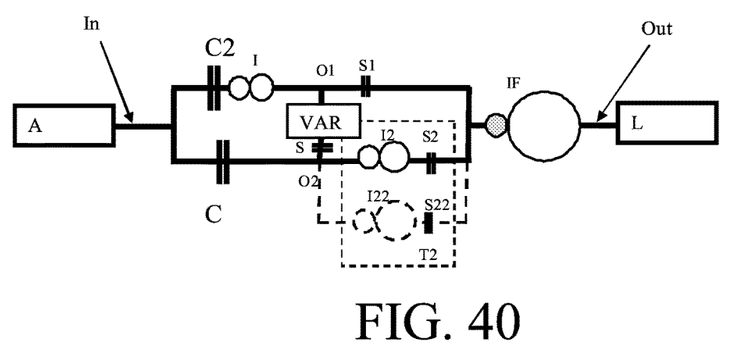
Figure 41:
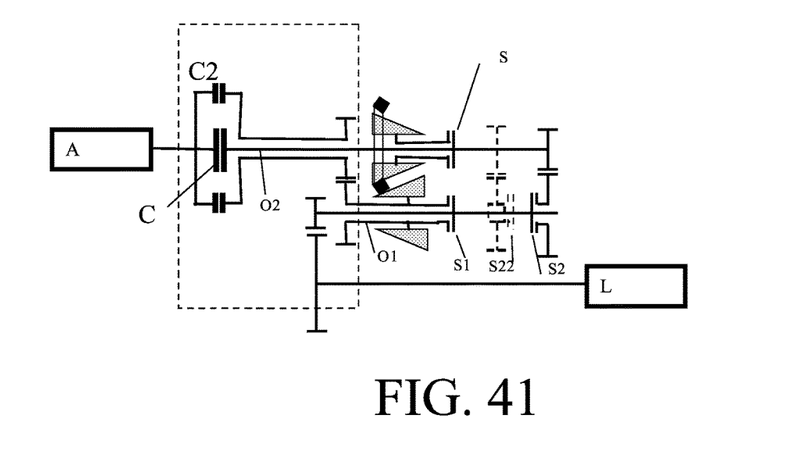
Figure 42:
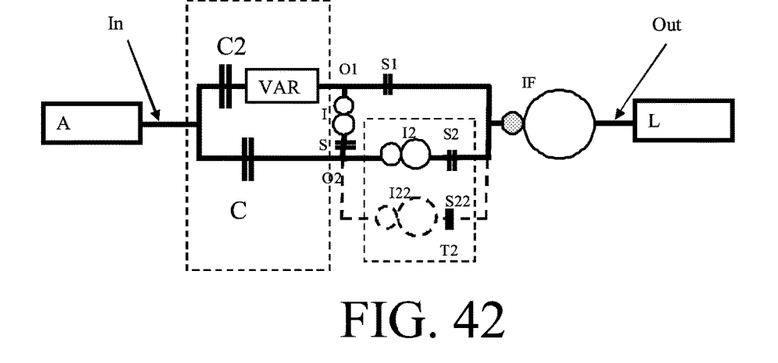
Figure 43:
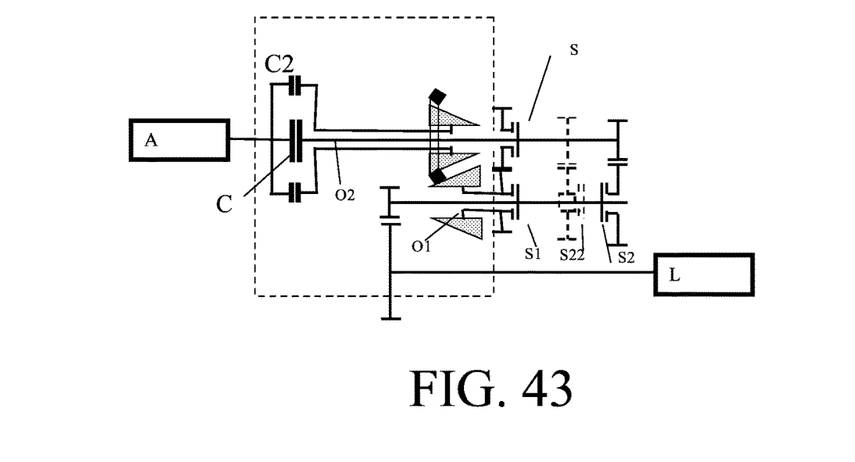
Figure 44:
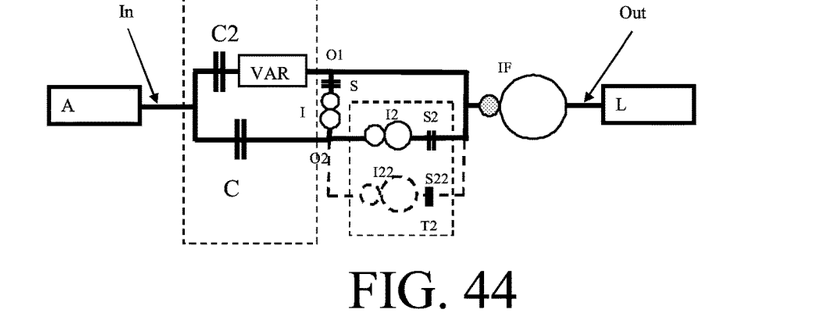
Figure 45:
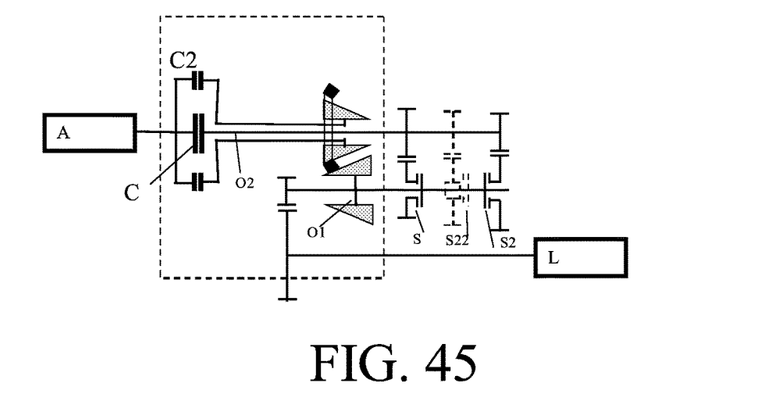

In the embodiments shown in FIGS. 32 and 34 the variable speed drive is such that it changed the direction of rotation is (for example a cone-ring variable speed drive). This saves one toothed gear reduction.

In the embodiments shown in FIGS. 35 to 45 the transmission system comprises a clutch C2.

Figure 46:
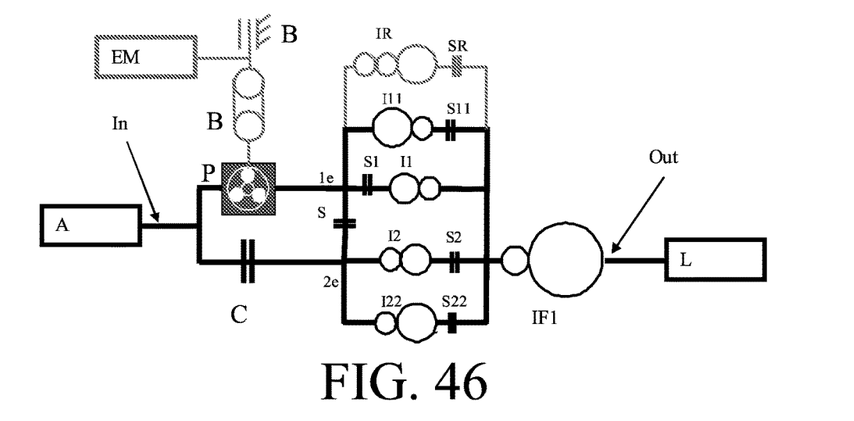
FIGS. 46 and 47 show still further embodiments of a transmission system according to the invention, which according to these figures is a 6/7 speed transmission having a brake and a clutch, as well as a single lay-shaft.
Figure 47:
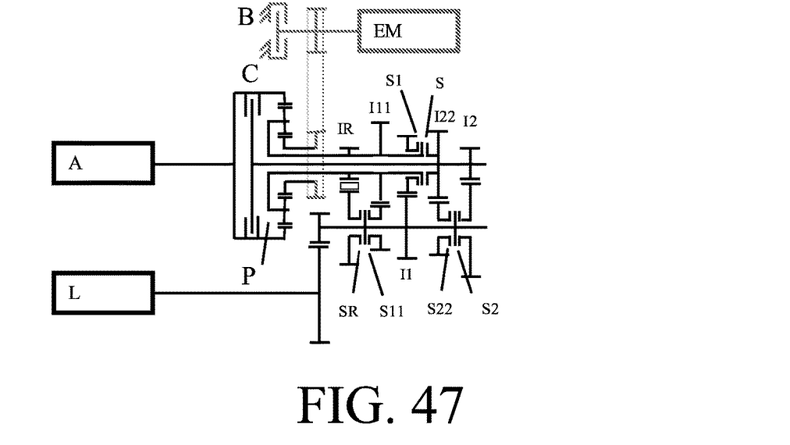

The transmission system shown in FIGS. 46 and 47 is a 6/7 speed transmission having a brake B and a clutch C and a single lay-shaft. In total there are 13 gearwheels and a planetary gear set which constitute 8 forward gearwheels, 3 reverse gearwheels, 2 final drive gearwheels and 6 synchronizers (incl. reverse). Electric motor EM is an electric motor-generator which is connected to the third rotational member (sun wheel) of the planetary set. Preferably the electric motor is connected to the sun wheel by means of a chain drive or gear wheel drive. The brake B is optionally because the electric motor EM—when large enough—is also able to support the torque of the combustion engine. With the electric motor EM and the planetary set a so called electric variable transmission is created with which steples scan be switched between ratio's in the transmission. Brake B can be added, for example in line with the shaft of the electric motor EM in case the electric motor is small. The brake B can be a claw to the fixed world of a force closed friction clutch. The electric motor EM is preferably parallel with the shafts of the transmission outside the housing of the transmission. With the electric motor also transmission clutches can be synchronized or synchronization can be supported.

Although the present invention is elucidated above on the basis of the given drawings, it should be noted that this invention is not limited whatsoever to the embodiments shown in the drawings. The invention also extends to all embodiments deviating from the embodiments shown in the drawings within the context defined by the claims.

The invention claimed is:

1. A transmission system comprising: a clutch module having an input, a first output, and a second output; a first clutch device provided with first actuating means between the first output and the input, and between the second output and the input is a second clutch device with second actuating means; a transmission module, with an output and a first input and a second input, wherein between the first input and the output a first partial transmission is provided with at least one transmission, and between the second input and the output a second partial transmission is provided with at least one further transmission or a mechanical connection; wherein the first and second outputs of the clutch module are connected to the first and second inputs of the transmission module; a short-circuit clutch, which is present between the first and second outputs of the clutch module and/or the first and second inputs of the transmission module; and wherein the transmission inside the first partial transmission is continuously variable within a specified transmission range.

2. The transmission system according to claim 1, wherein the transmission within the first partial transmission has been carried out electrically.

3. The transmission system according to claim 1, wherein the transmission in the partial transmission is constructed as a planetary gear provided with at least three rotational members, of which a first rotation body forms the input of the transmission, a second rotation body forms the output of the transmission, and a third rotation body is connected to an electric motor that can be operated both as a motor and as a generator.

4. The transmission system according to claim wherein the transmission in the partial transmission is carried out hydraulically.

5. The transmission system of claim 1, further comprising a speed transforming means present between the input and the first output.

6. The transmission system according to claim 5, wherein the speed transforming means is embodied as a mechanical transmission.

7. The transmission system according to claim 5, wherein the speed transforming means are designed as a bypass transmission that includes a planetary gear train provided with at least three rotational members, of which a first rotation body is connected to the input a second rotation body is connected to the first output, and a third rotation body is connected to the first clutch device.

8. The transmission system of claim 1, wherein the first clutch device and/or the second clutch device is designed as a brake.

9. The transmission system according to claim 8, wherein the brake is formed by a claw clutch, or by a friction brake.

10. The transmission system of claim 3, wherein the first and/or second clutch device is constructed as an electric motor comprising a stator and a rotor, wherein the stator is fixed and the rotor is connected to one of the at least three rotational members.

11. The transmission system of claim 1, wherein the second clutch device is formed by a clutch which is present between the input and the second output of the clutch module.

12. Transmission system according to claim 11, characterized in that the second clutch device is formed by a claw clutch, or by a friction clutch.

13. The transmission system of claim 1, wherein the first clutch device is formed by a friction brake, and the second clutch device is formed by a friction clutch.

14. The transmission system of claim 1, further comprising a first transmission clutch is present between the first output of the clutch module and the output of the transmission system.

15. Transmission system as claimed in any one of the preceding claims, characterized in that a second transmission clutch is present between the second output of the clutch module and the output of the transmission system.

16. The transmission system of claim 1, further comprising a speed transforming gear present between the first output of the clutch module and the output of the transmission system.

17. The transmission system of claim 1, wherein one or both of the first and second clutch devices and/or the short-circuit clutch is/are constructed as a claw clutch and/or synchroniser.

18. The transmission system of claim 3, wherein the transmission system comprises an electric motor which is coupled or can be coupled with one or more of the at least three rotational members.

19. The transmission system of claim 3, wherein a transmission ratio of a speed transforming means of the clutch module is chosen such that it is slowing down to the first or second output of the clutch module in case the first clutch device is braked.

20. The transmission system of claim 1, wherein the most reducing transmission gearing of the transmission module is present in the second partial transmission.

* * * * *